3,108,145
PREPARATION OF OLEFIN POLYMERS
Donald H. Antonsen, Glen Mills, Pa., assignor to Sun Oil Company, Philadelphia, Pa., a corporation of New Jersey
No Drawing. Filed Nov. 29, 1960, Ser. No. 72,281
16 Claims. (Cl. 260—683.15)

This invention relates to the polymerization of alpha olefins for the purpose of preparing liquid polymers of the $C_{10}$–$C_{24}$ range.

Alpha olefins, such as ethylene, propylene, 1-butene and the like, can be polymerized at room temperature by means of a catalyst system comprising titanium tetrachloride and an alkyl aluminum chloride in a solvent. The aluminum compound can be a monochloride, a dichloride or a sesquichloride. The solvent can be a paraffin hydrocarbon such as heptane or an aromatic hydrocarbon such as benzene. When an aromatic solvent is used, the reaction system must be strictly anhydrous to obtain only polymerization of the olefin, since the presence of even a small amount of water will cause the catalyst to have alkylating activity and result in alkylation of the aromatic by the olefin polymer. The polymers obtained generally will range from relatively low boiling liquids to solids, and a substantial amount of product boiling in the lubricating oil range usually is obtained.

The lower boiling polyolefins produced in this manner, such as the $C_{10}$–$C_{24}$ polymers, are useful as intermediates for preparing detergents. They can be sulfated and neutralized with caustic soda to produce one type of detergent; or they can be alkylated with benzene and the alkylation product can be sulfonated and then neutralized to produce another type. When the polymerization reaction is carried out to obtain material for detergent preparation, it is desirable to maximize the yield of the $C_{10}$–$C_{24}$ polymers and suppress the formation of material of the lubricating oil range and of solid polymers.

An object of the present invention is to increase the yield of the detergent intermediate polymers in the above-discussed type of polymerization reaction.

It has now been found that the weight average molecular weight of the total polymerization product can be reduced by incorporating in the catalyst system certain polyethers, provided that the solvent used is a $C_6$–$C_{10}$ aromatic hydrocarbon. The polyethers which can be used for this purpose can be monoglyme (ethylene glycol dimethyl ether), diglyme (diethylene glycol dimethyl ether), triglyme (triethylene glycol dimethyl ether) or tetraglyme (tetraethylene glycol dimethyl ether). The amount of polyether in proportion to the amount of alkyl aluminum halide employed must not exceed a certain limit, as otherwise the catalyst system will be completely deactivated. The use of the polyether in proper amount in combination with an aromatic solvent shifts the average molecular weight of the product downwardly and results in a higher yield of the desired $C_{10}$–$C_{24}$ polymers. Curiously, when a paraffin hydrocarbon is used as the solvent, addition of the polyether to the catalyst system has the opposite effect and higher molecular weight products are obtained.

According to the invention, an increased yield of polymers of the $C_{10}$–$C_{24}$ range is obtained by contacting an alpha olefin at a temperature in the range of —30 to +15° C. with a catalyst system comprising a $C_6$–$C_{10}$ aromatic, as hereinafter specified, containing a catalytic mixture of the following components: (1) titanium tetrachloride or tetrabromide; (2) an alkyl aluminum monohalide, dihalide or sesquihalide in which the halogen is chlorine or bromine; and (3) either monoglyme, diglyme, triglyme or tetraglyme. The atomic ratio of Al to Ti in the catalyst system should lie in the range of 0.1–1.0 and the amount of polyether employed should be such that the atomic ratio of oxygen (O) to Al should be in the range of 0.2–1.6 and preferably below 0.7. Highest catalytic activity is obtained when the O:Al ratio is about 0.3.

The aluminum compound used in the catalyst system can be any alkyl aluminum chloride or bromide in which the alkyl group has 2–10 carbon atoms. Preferably the alkyl group is either ethyl or isobutyl because of availability of these compounds. Also it is preferred that the aluminum compound be a dihalide, for example, ethyl aluminum dichloride.

The optimum temperature for carrying out the polymerization reaction varies dependent upon whether the aluminum compound is a monohalide, dihalide or sesquihalide. The optimum temperature for the monohalides is in the range of —30 to 0° C. and for the dihalides —15 to +15° C. The sesquihalides give good results throughout the entire range of —30 to +15° C.

The olefin starting material can be any alpha olefin of the $C_2$–$C_8$ range. Normally gaseous olefins such as ethylene, propylene and butene-1 are preferred. The solvent can be any aromatic hydrocarbon of the $C_6$–$C_{10}$ range which has no more than two alkyl substituents. Examples are benzene, toluene, xylenes, ethyl benzene, n-propyl benzene, methyl ethyl benzenes and tertiary butyl benzene. $C_6$–$C_8$ aromatics are preferred. Aromatics which have more than two alkyl substituents, such as mesitylene, pseudocumene, isodurene and the like are not suitable for use in the process. A minor amount of paraffin hydrocarbon can be present in the solvent but it must be preponderantly aromatic to secure the desired effect.

The polymerization reaction is carried out by adding the three catalytic components to a relatively large volume of the aromatic solvent in a reactor, regulating the temperature to within the range of —30 to +15° C., and feeding in the olefin while agitating the mixture. As the olefin is consumed, additional amounts are added either intermittently or continuously until the rate of reaction becomes too slow. The reaction can be carried out at atmospheric pressure or at elevated pressures up to, for example, 500 p.s.i.g. After the reaction is complete, alcohol is added to kill the catalyst, the mixture is filtered to remove any solid polymers and the filtrate is water washed to remove the alcohol and catalyst residue. The solvent is then evaporated and the polymerization product is distilled under vacuum to separate the desired detergent intermediate stock from higher boiling polymers. The latter can be cut into appropriate fractions which by hydrogenation or by alkylation with benzene yield high viscosity index lubricating oils as by-products.

The following comparative examples illustrate the invention more specifically:

EXAMPLES

Two runs were made in which ethylene was polymerized using benzene as solvent and $TiCl_4$ and ethyl aluminum dichloride as catalyst components. Both the benzene and ethylene had been pretreated to remove traces of moisture. In each run 8.05 ml. of a 1.20 molar solution of $TiCl_4$ in n-heptane were added to 400 g. of benzene and the amount of ethyl aluminum dichloride added was such that the atomic ratio of Al:Ti was 0.57. The reaction was carried out at about 7° C. and ethylene was fed into the reactor at 2–6 p.s.i.g. over a time of 4.5 hours while the mixture was being stirred. In one run no polyether was added while in the other diglyme was incorporated in the catalyst system in amount such that the O:Al atomic ratio was 0.3. In the run without diglyme the yield of total polymer was 47.5% based on the ethylene fed to the reactor, while in the run with diglyme this yield was 59.8%. This shows that the presence of diglyme in the proportion used caused an increase in reaction rate. Upon working up the reaction products and vacuum distilling, the fractions shown in Table I were obtained.

Table I

| Fraction | Boiling Range @ 0.2 mm. Hg, °C. | Without Diglyme | | With Diglyme | |
|---|---|---|---|---|---|
| | | Percent of Total Polymer | R.I., $n_D^{20}$ | Percent of Total Polymer | R.I., $n_D^{20}$ |
| $C_{10}$–$C_{12}$ | Int. to 50 | 15.7 | 1.4266 | 12.6 | 1.4291 |
| $C_{12}$–$C_{18}$ | 50–100 | 27.5 | 1.4387 | 34.6 | 1.4375 |
| $C_{18}$–$C_{24}$ | 100–150 | 18.4 | 1.4495 | 24.0 | 1.4492 |
| #1 lube | 150–210 | 20.5 | 1.4563 | 16.0 | 1.4558 |
| #2 lube | 210–280 | 16.6 | (Semi-solid) | 9.3 | 1.4617 |
| #3 lube | 280–340 | 0.0 | | 2.1 | |
| Residue | 340 | 1.2 | | 1.3 | |
| Solid Polymer | | Trace | | Trace | |

In the run without diglyme the weight ratio of $C_{10}$–$C_{24}$ polymers to higher boiling polymers was 1.61:1, whereas in the run with diglyme this ratio increased to 2.48:1. Hence it can be seen that the presence of the polyether in the catalyst system substantially increased the yield of polymers suitable as detergent intermediates.

Table II shows conditions used in a series of runs and the effect on the weight average molecular weight of the total polymer produced.

Table II

| Run No. | Solvent | Aluminum Compound | Al:Ti Ratio | O:Al Ratio | Wt. Avg. M.W. |
|---|---|---|---|---|---|
| A-1 | benzene | ethyl dichloride | 0.57 | 0 | 352 |
| A-2 | do | do | 0.57 | 0.3 | 321 |
| A-3 | do | do | 0.57 | 0.6 | 311 |
| A-4 | do | do | 0.57 | 1.5 | 160 |
| B-1 | 80% heptane [1] | do | 0.57 | 0 | 369 |
| B-2 | do | do | 0.57 | 0.3 | 411 |
| B-3 | do | do | 0.57 | 1.0 | 441 |
| B-4 | do | do | 0.57 | 1.5 | 453 |
| C-1 | 80% heptane [1] | do | 2.28 | 0 | 712 |
| C-2 | do | do | 2.28 | 0.3 | 10,000 |
| C-3 | do | do | 2.28 | 1.1 | 138,000 |
| D-1 | benzene | ethyl sesquichloride | 0.57 | 0 | 413 |
| D-2 | do | do | 0.57 | 0.3 | 324 |

[1] 80 mole percent—20 mole percent benzene mixture.

Run Nos. A-1 and A-2 are the same as shown in Table I. From the A and D series of runs it can be seen that with either ethyl aluminum dichloride or ethyl aluminum sesquichloride in a benzene solvent and with a ratio of Al:Ti of 0.57, the addition of diglyme continuously decreases the weight average molecular weight of the polymerization product up to an O:Al ratio of 1.5. As diglyme is added to these systems the activity of the catalyst increases up to an O:Al ratio of about 0.3 and thereafter gradually decreases. It was found that when an O:Al ratio of about 1.6 is reached, the catalyst becomes completely deactivated and no polymerization is obtained. In both the B and C series of runs the solvent used was largely paraffinic, being a mixture of n-heptane and benzene in a molar ratio of 80:20. Also in the C series of runs the Al was used in substantial excess over the Ti. The results from these runs show that the addition of diglyme had the opposite effect obtained in the A and D runs and caused the formation of higher molecular weight polymers. In the C series substantial amounts of very high molecular weight polymers which were solids were obtained.

From the data presented it can be seen that in order to increase the yield of the desired lower molecular weight polymers by the addition of diglyme to the catalyst, the solvent should be an aromatic and the Al should not be in atomic excess of the Ti.

When the other polyethers as herein specified are substituted for diglyme, substantially similar results are obtained. The same is true when the halogen in the catalyst system is bromine instead of chlorine.

I claim:
1. Method of preparing olefin polymers of the $C_{10}$–$C_{24}$ range which comprises contacting an alpha olefin at a temperature in the range of −30 to +15° C. with a catalyst system comprising a $C_6$–$C_{10}$ aromatic hydrocarbon, which has no more than two alkyl substituents, containing a catalytic mixture of (1) a titanium tetrahalide in which the halogen is selected from the group consisting of chlorine and bromine, (2) an aluminum compound selected from the group consisting of alkyl aluminum dihalides, dialkyl aluminum halides and alkyl aluminum sesquihalides wherein the halogen is selected from the group consisting of chlorine and bromine, and (3) a polyether selected from the group consisting of ethylene glycol dimethyl ether, diethylene glycol dimethyl ether, triethylene glycol dimethyl ether and tetraethylene glycol dimethyl ether, the titanium tetrahalide and aluminum compound being such that the atomic ratio of Al to Ti is in the range of 0.1–1.0 and the amount of polyether being such that the atomic ratio of O to Al is in the range of 0.2–1.6, and separating olefin polymers of the $C_{10}$–$C_{24}$ range from the reaction mixture.

2. Method according to claim 1 wherein the aluminum compound is an alkyl aluminum dihalide and the temperature is in the range of −15 to +15° C.

3. Method according to claim 2 wherein the polyether is diethylene glycol dimethyl ether.

4. Method according to claim 3 wherein the aluminum compound is ethyl aluminum dichloride.

5. Method according to claim 1 wherein the polyether is diethylene glycol dimethyl ether.

6. Method according to claim 1 wherein the aluminum compound is an alkyl aluminum sesquihalide.

7. Method according to claim 6 wherein the polyether is diethylene glycol dimethyl ether.

8. Method according to claim 7 wherein the aluminum compound is ethyl aluminum dichloride.

9. Method according to claim 1 wherein the alpha olefin is ethylene.

10. Method according to claim 9 wherein the aluminum compound is an alkyl aluminum dihalide and the temperature is in the range of −15 to +15° C.

11. Method according to claim 10 wherein the polyether is diethylene glycol dimethyl ether.

12. Method according to claim 9 wherein the aluminum compound is an alkyl aluminum sesquihalide.

13. Method according to claim 12 wherein the polyether is diethylene glycol dimethyl ether.

14. Method according to claim 1 wherein the atomic ratio of O to Al is about 0.3.

15. Method according to claim 14 wherein the polyether is diethylene glycol dimethyl ether.

16. Method according to claim 1 wherein the solvent is aromatic hydrocarbon of the $C_6$–$C_8$ range.

References Cited in the file of this patent

UNITED STATES PATENTS

| 2,907,805 | Bestian et al. | Oct. 6, 1959 |
| 2,935,542 | Minckler et al. | May 3, 1960 |
| 2,993,942 | White et al. | July 25, 1961 |

FOREIGN PATENTS

| 785,314 | Great Britain | Oct. 23, 1957 |
| 809,717 | Great Britain | Mar. 4, 1959 |